United States Patent [19]
Schweizer

[11] Patent Number: 5,919,011
[45] Date of Patent: Jul. 6, 1999

[54] METHOD FOR OPERATING A MACHINE TOOL

[75] Inventor: Anton Schweizer, Wurmlingen, Germany

[73] Assignee: CHIRON-WERKE GmbH & Co. KG, Germany

[21] Appl. No.: 08/870,964

[22] Filed: Jun. 6, 1997

[30] Foreign Application Priority Data

Jun. 12, 1996 [DE] Germany .................. 196 23 422

[51] Int. Cl.⁶ ..................... B23C 9/00; B23Q 3/155
[52] U.S. Cl. ................................. 409/131; 483/14
[58] Field of Search ........................... 409/131, 132, 409/172, 168, 163, 164, 165, 166, 167, 225, 219; 483/14, 15; 29/33 P

[56] References Cited

U.S. PATENT DOCUMENTS

| | | | |
|---|---|---|---|
| 4,571,814 | 2/1986 | Palfery et al | 483/14 |
| 4,629,378 | 12/1986 | Parsons | 409/131 |
| 4,637,107 | 1/1987 | Romeu | 409/131 X |
| 4,664,570 | 5/1987 | Tsukiji et al. | 409/132 X |
| 4,712,282 | 12/1987 | Romeu | 409/168 X |
| 4,716,647 | 1/1988 | Winkler et al. | 483/14 |
| 4,947,538 | 8/1990 | McMurtry | 483/14 |

FOREIGN PATENT DOCUMENTS

| | | |
|---|---|---|
| 3624284A1 | 2/1987 | Germany . |
| 3620343C2 | 3/1987 | Germany . |

Primary Examiner—William Briggs
Attorney, Agent, or Firm—Cummings & Lockwood

[57] ABSTRACT

A method is disclosed for operating a machine tool which comprises a spindle rotatable about a spindle axis; a spindle gripper, carried by the spindle, for gripping workpieces; and a cradle apparatus that can be pivoted back and forth about a pivot axis of the cradle apparatus extending approximately perpendicular to the spindle axis. In the method, the cradle apparatus with a clamped workpiece is set up in a first position, whereupon the clamped workpiece is removed from the cradle apparatus and held with the spindle gripper. The empty cradle apparatus is then pivoted into a second position, and/or the spindle gripper holding the workpiece is pivoted about the spindle axis. Lastly, the workpiece held by the spindle gripper is inserted back into the cradle apparatus, and the latter is pivoted into a further position for further machining of the workpiece that is once again clamped in.

8 Claims, 4 Drawing Sheets

METHOD FOR OPERATING A MACHINE TOOL

BACKGROUND OF THE INVENTION

1. Field of the Invention

The present invention relates to a method for operating a machine tool which comprises a spindle rotatable about a spindle axis; a spindle gripper, carried by the spindle, for gripping workpieces; and a cradle apparatus into which workpieces to be machined can be clamped and can be pivoted back and forth about a pivot axis of the cradle apparatus extending approximately perpendicular to the spindle axis.

A machine tool of this kind is presently being designed in the facilities of the assignee, which are not accessible to the public.

The purpose of the cradle or pivot apparatus is to clamp workpieces in such a way that they can be machined, not only in a horizontal position but also in two vertical positions each pivoted through approximately 90 degrees, by tools clamped in the spindle. The cradle apparatus thus offers, so to speak, an additional machine axis.

With the machine tool described to this point, it is possible to machine workpieces in one clamping not only on its top surface but also on the two side surfaces. The workpieces can, in this context, be held in three positions each pivoted 90 degrees with respect to one another, or also in intermediate positions. Not accessible for machining are the end surfaces of the workpieces, on which clamping jaws of a clamping apparatus arranged on the cradle apparatus engage; and the underside of the workpieces, remote from the top surface, which faces toward the clamping apparatus.

2. Related Prior Art

A machine tool known from DE 36 20 343 C2 is moreover equipped with a spindle gripper which is used to transport workpieces on the workpiece table between a pallet with workpieces held in reserve and a clamping apparatus. In this context, the spindle gripper is inserted into and removed from the spindle in the manner of, for example, an ordinary tool.

It is also known from DE 36 20 343 C2 to configure the spindle gripper rotatably, by equipping it with, for example, a rotary drive actuated by external force. This rotary drive can be activated, for example, by fluids or electrical power; the fluid and/or power can be supplied through the spindle itself. Rotatable spindle grippers of this kind are used for positionally correct adjustment of workpieces to tools installed immovably on the workpiece table, or for positionally correct placement of the machined workpieces onto a second pallet.

In the case of the aforementioned machine tool, when the underside and/or the end surfaces of the workpieces also need to be machined, the workpieces must be reclamped for that purpose. This is done either manually or with an additional handling device, for example in the form of a robot arm.

In the case of manual reclamping, it is disadvantageous that the required workpiece reclamping time is relatively long. A further disadvantage consists in the fact that manual reclamping entails a certain inaccuracy, so that positionally correct association between holes made before and after reclamping often cannot be maintained.

The use of an additional handling device leads to an overall increase in machine costs, and has the further disadvantage that a portion of the surface of the workpiece table is occupied by said handling device and is thus no longer available for other tasks. A further disadvantage of the handling device is that collisions between the handling device and the spindle must be avoided, which requires a considerable expansion of the usual machine control system.

SUMMARY OF THE INVENTION

In view of the above, it is an object of the present invention to provide a method of the kind cited at the outset so that with a minimum of design changes to a machine tool, workpieces to be machined can be reclamped quickly in such a way that the underside of the workpieces becomes accessible for machining.

In the case of the method cited at the outset, this object is achieved, according to the invention, by the following steps:

a) Set up the cradle apparatus with a clamped workpiece and in a first position;

b) Remove the clamped workpiece from the cradle apparatus with the spindle gripper and hold the workpiece in the spindle gripper;

c) Pivot the empty cradle apparatus into a second position and/or rotate the spindle gripper holding the workpiece about the spindle axis;

d) Insert the workpiece, held by the spindle gripper, into the cradle apparatus again; and e) Pivot the cradle apparatus into a further position for further machining of the workpiece that is once again clamped in.

The object underlying the invention is completely achieved in this fashion.

Specifically, the inventor of the present application has recognized that by means of the simple sequence "remove—pivot and/or rotate—insert—pivot", it is possible to reclamp the workpiece in such a way that its underside faces upward or to the side, and is thus accessible for machining. It is of particular advantage in the case of this method that no design changes are required to the machine tool cited initially. A further advantage consists in the fact that only very slight changes or additions to the sequence control system of the aforementioned machine tool are needed in order to implement the new method. Because, with the new method, reclamping of the workpieces—i.e. in particular the removal and reinsertion of the workpieces from and into the clamping apparatus present on the cradle apparatus—is accomplished by means of the spindle gripper positioned by the spindle, reclamping is performed with a very high accuracy, so that the aforesaid disadvantages are eliminated.

Reclamping of the workpieces also takes place in a very brief period: besides the tool changing time required to exchange the previously used machining tool for the spindle gripper, all that needs to be taken into account is the time during which the cradle apparatus pivots and/or the spindle gripper is moved or rotated by the spindle head or spindle.

In an embodiment, it is preferred if the cradle apparatus in step a) is set up in a vertical position pivoted approximately 90 degrees out of its horizontal position; in step c) is pivoted approximately 180 degrees into its other vertical position; and in step e) is pivoted 90 degrees back into the horizontal position.

The advantage with this feature is that once reclamping has occurred, the underside of the workpiece faces upward when the cradle apparatus is once again in its horizontal position. The workpiece therefore now rests with its former top surface on the clamping apparatus, so that regardless of the holding force of the clamping apparatus, the workpiece does not slide downward during machining. A further advantage with this feature is the fact that a rotatable spindle gripper is not required.

In another embodiment, it is preferred if, in step c), the cradle apparatus is not pivoted but rather the spindle gripper is rotated 180 degrees.

This feature has the same advantages as in the case of the embodiment described above, but because of the rotatable spindle gripper that is now provided, reclamping of the work-piece occurs much more quickly. The reason is that the spindle gripper can rotate 180 degrees in a considerably shorter time than the cradle apparatus can pivot.

On the other hand, it is preferred if the cradle apparatus in step a) is set up in its horizontal position; in step c) is pivoted approximately 90 degrees into one vertical position; and in step e) is pivoted 180 degrees into its other vertical position. Additionally in step c), the spindle gripper can also be rotated 90 degrees.

The advantage here is that after reclamping has occurred, with the cradle apparatus in one vertical position the former underside of the workpiece faces upward, while with the cradle apparatus in the horizontal position either one of the original side surfaces, or one of the original end surfaces, faces upward. An advantage of these features is therefore the fact that in addition to the underside, one of the otherwise inaccessible end surfaces has also been made accessible for machining.

On the whole, however, the advantage with these features is that either the end surface just made accessible, or the side surface that was already accessible, are now positioned so that they can be machined with the cradle apparatus in the horizontal position, in which the workpiece cannot slip under pressure from above.

On the other hand, it is preferred if the cradle apparatus in step a) is set up in a vertical position pivoted approximately 90 degrees from its horizontal position; in step c) is pivoted approximately 90 degrees back into its horizontal position; and in step e) is pivoted 90 degrees back into its first vertical position.

This feature also leads to the advantages already mentioned above, namely that on the one hand the underside is now accessible for machining, and on the other hand one of the original side surfaces faces upward with the cradle apparatus in the horizontal position .

Further advantages are evident from the description and the attached drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is depicted in the drawings and will be explained in more detail in the description below. In the drawings.

DETAILED DESCRIPTION OF PREFERRED EMBODIMENTS

Figure 1:
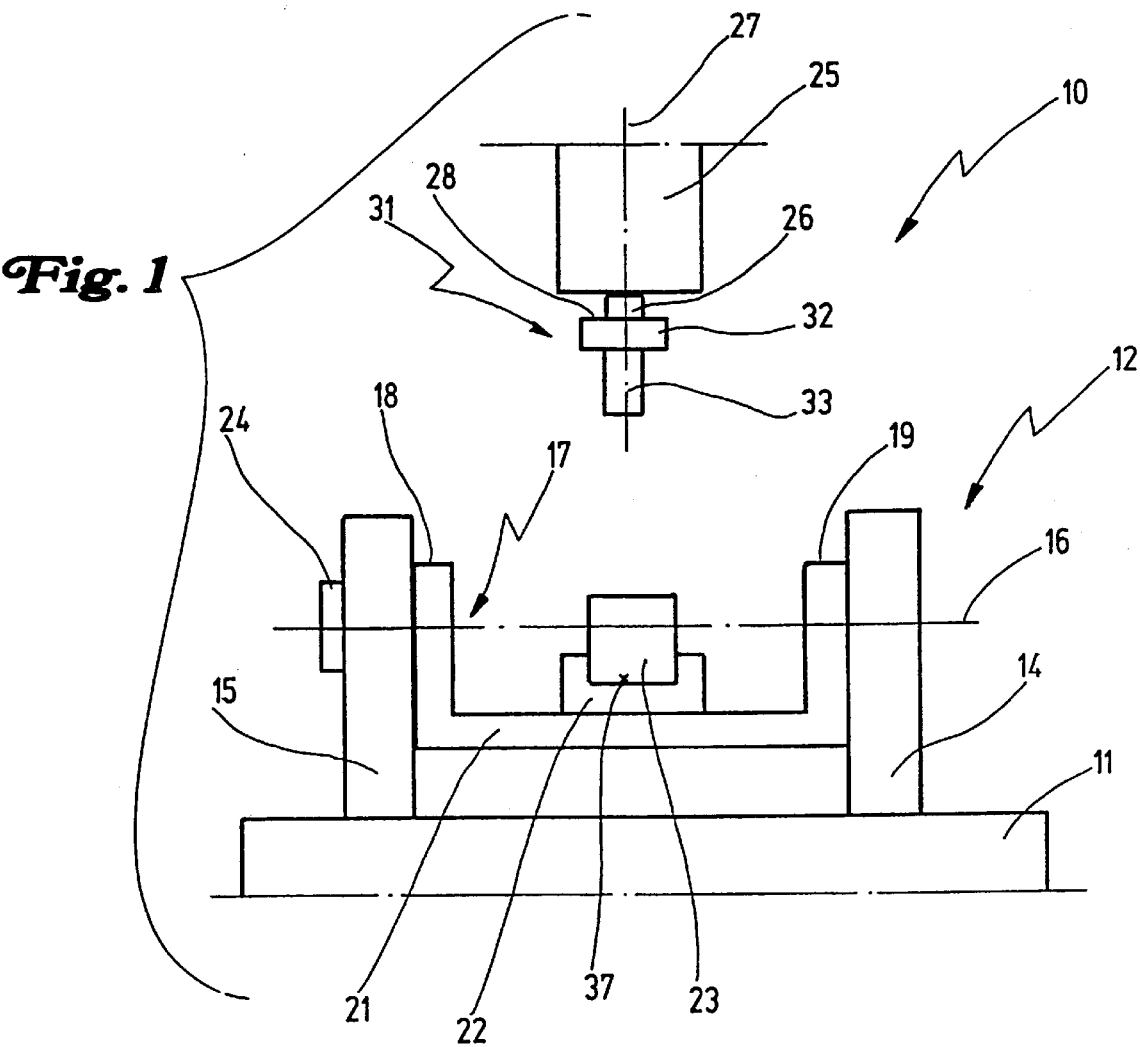
FIG. 1 shows a schematic side view of the machine tool on which the new method is carried out.

FIG. 1 schematically shows a new machine tool 10 which comprises a workpiece table 11 on which a cradle apparatus 12 is arranged. Cradle apparatus 12 comprises, in a manner known per se, two uprights 14, 15 spaced apart from one another, between which a U-shaped holder 17 is mounted pivotably about a pivot axis indicated at 16.

U-shaped holder 17 comprises two limbs 18, 19 by means of which mounting on uprights 14, 15 is accomplished. Extending between limbs 18, 19 is a cradle plate 21 on which is arranged a clamping apparatus 22 for workpieces 23 to be machined. Also evident on upright 15 is a drive 24 by means of which U-shaped holder 17 can be pivoted +/−90 degrees about pivot axis 16 out of the horizontal position shown in FIG. 1 into one of its two vertical positions. Of course it is also possible to pivot U-shaped holder 17 into arbitrary intermediate positions.

Schematically indicated above cradle apparatus 12 is a spindle head 25, displaceable in known manner in three coordinate directions relative to workpiece table 11, in which a spindle 26 is mounted rotatably about its spindle axis 27. Spindle axis 27 extends perpendicular to pivot axis 16.

Spindle 26 is designed at its lower end 28, in known fashion, to receive standardized tool holders.

In the state shown in FIG. 1, a spindle gripper 31 is located on spindle 26. Said spindle gripper 31 is rotatable about spindle axis 27, for which purpose in this case a gripper drive 32, to which gripper jaws 33 are attached, is provided. Gripper drive 32 serves on the one hand to adjust gripper jaws 33, and on the other hand to rotate the gripper jaws about spindle axis 27. The necessary energy input, and control of gripper drive 32, are provided through spindle 26, as is known from above-mentioned DE 36 20 343 C2.

Figure 2:
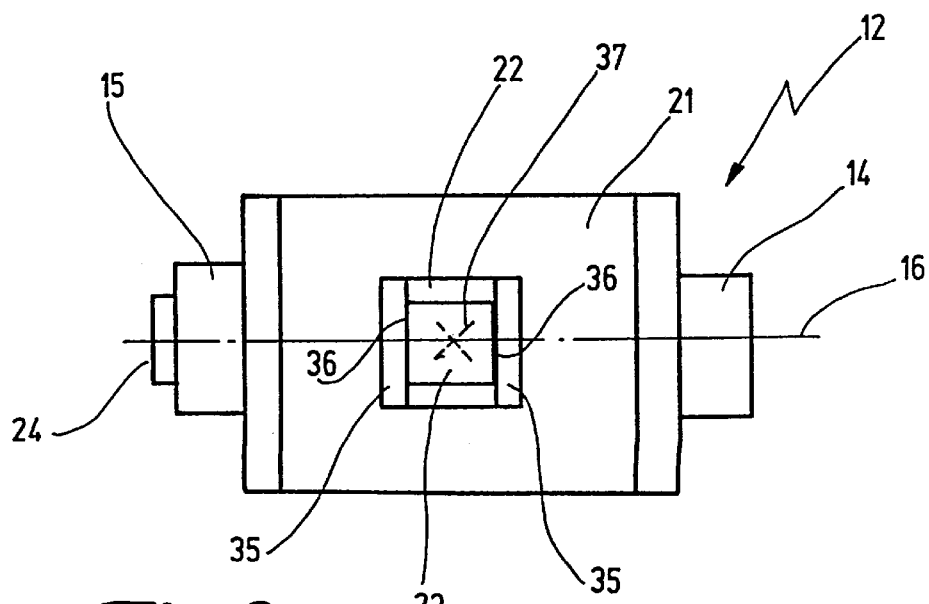
FIG. 2 shows a plan vie w of the cradle apparatus of the machine tool of FIG. 1.
Figure 3A:
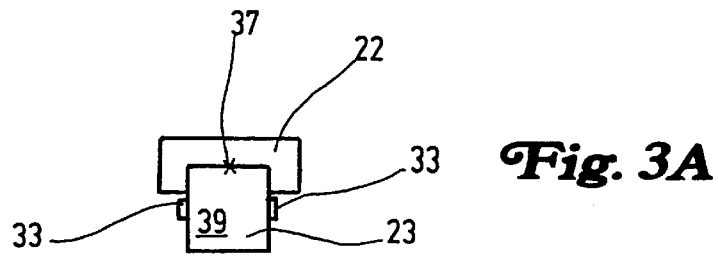
FIG. 3 shows, in a schematic depiction like that of FIG. 2, the procedure for reclamping a workpiece, in two alternative embodiments.
Figure 3B:
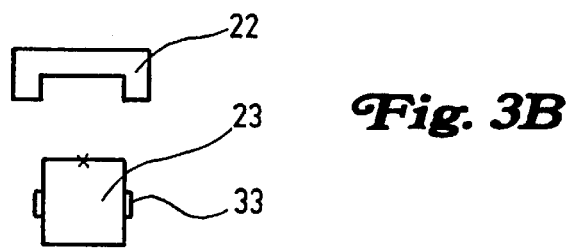
Figure 3C:
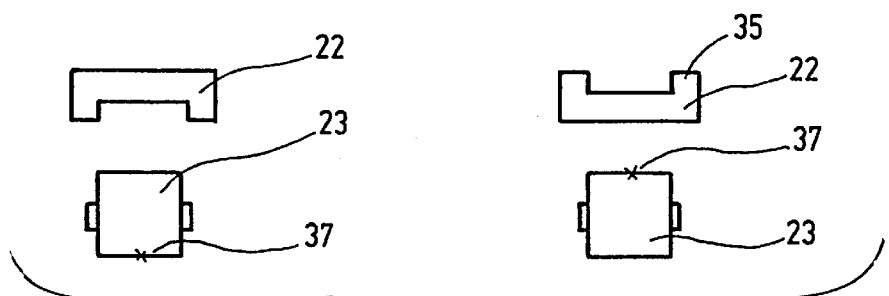
Figure 3D:
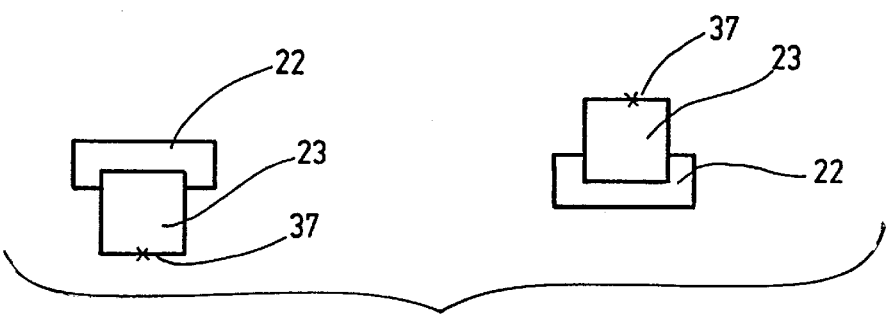
Figure 3E:
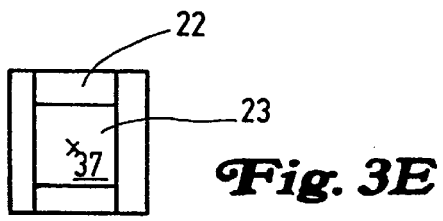
Figure 4A:
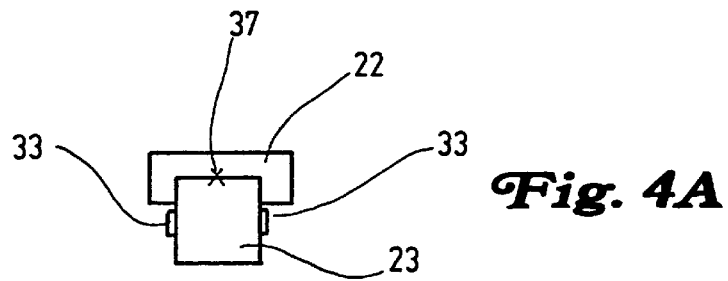
FIG. 4 s hows, in a depiction like that of FIG. 3, a further embodiment for the reclamping of a workpiece.
Figure 4B:
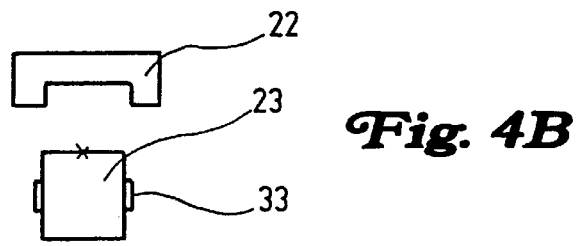
Figure 4C:
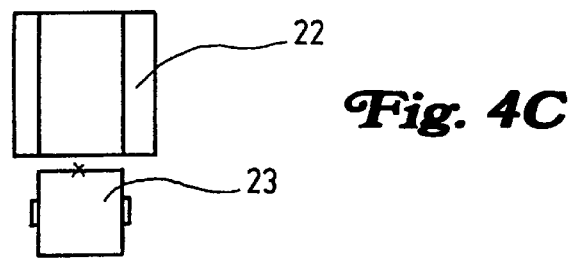
Figure 4D:
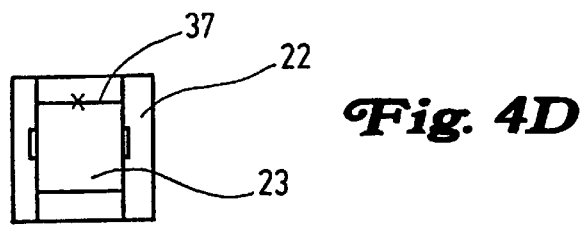
Figure 4E:
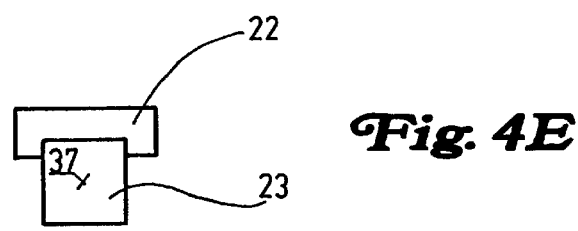
Figure 5A:
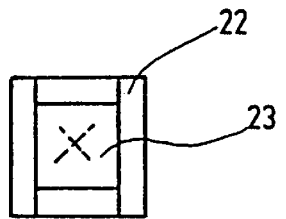
FIG. 5 shows two further embodiments for the reclamping of a workpiece.
Figure 5B:
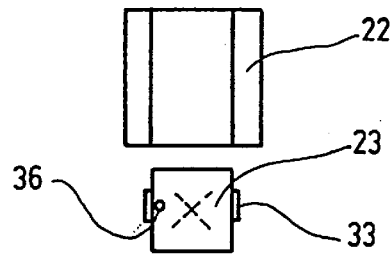
Figure 5C:
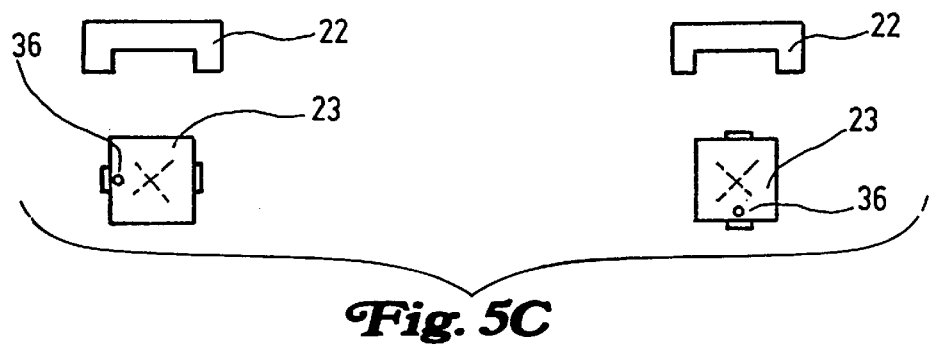
Figure 5D:
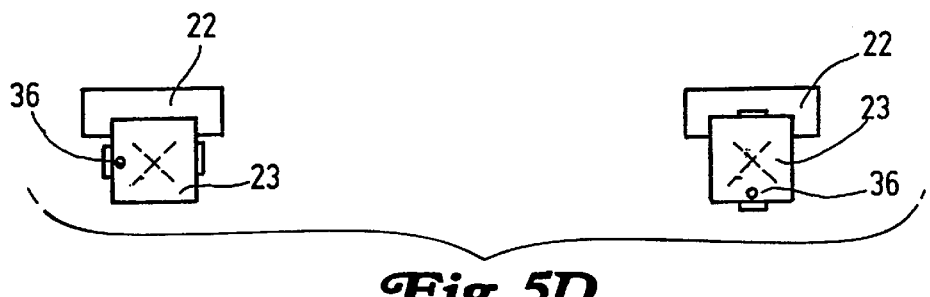
Figure 5E:
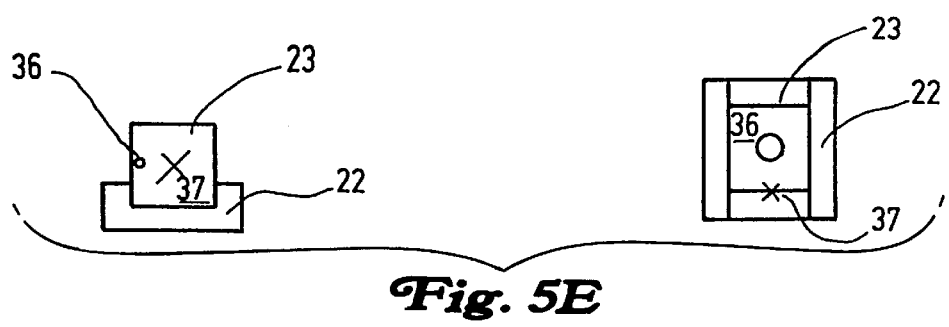

FIG. 2 shows a schematic plan view of cradle apparatus 12 of FIG. 1. It is evident that clamping apparatus 22 comprises two clamping jaws 35 which grip workpiece 23 at its end surfaces 36.

Machine tool 10 is characterized by the fact that in addition to cradle apparatus 12, a spindle gripper 31 is provided, which in this case is also rotatable. The combination of preferably rotatable spindle gripper 31 and cradle apparatus 12 now makes it possible, surprisingly, to clamp workpiece 22 in such a way that its underside 37, indicated schematically in FIG. 1 by an X, becomes accessible for machining. The way in which this occurs will now be demonstrated with reference to the schematic procedure diagrams of FIGS. 3 to 5.

FIG. 3 shows, in a schematic sequence and in a view like that of FIG. 2, a plan view of clamping apparatus 22, with received workpiece 23, pivoted by cradle apparatus 12.

In step a), the cradle apparatus is in its first vertical position, pivoted 90 degrees with respect to its horizontal position of FIGS. 1 and 2, in which workpiece 23 has one of its side surfaces 39 facing upward.

In step b), spindle gripper 31 has gripped workpiece 23 with its gripper jaws 33, and removed it from clamping apparatus 22.

In step c), the left-hand image shows the state in which the spindle gripper has rotated workpiece 23 about the spindle axis in such a way that its underside 37 now faces away from clamping apparatus 22.

Alternatively in step c), clamping apparatus 22 can also be pivoted 180 degrees by cradle apparatus 12 so that clamping jaws 35 initially face away from workpiece 23.

In step d), the spindle gripper has inserted workpiece 23 back into clamping apparatus 22, so that now the former underside 37 of workpiece 23 faces toward the top or bottom of FIG. 3.

In step e), clamping apparatus 22 has been pivoted back into its horizontal position, so that underside 37 of workpiece 23 is now accessible from above.

FIG. 4 shows a further embodiment for the reclamping of workpiece 23.

In step a), workpiece 23 is again set up as has already been described in step a) of FIG. 3. In step b), removal of workpiece 23 from clamping apparatus 22 is again accomplished by means of the spindle gripper.

In step c), clamping apparatus 22 has now been rotated by the cradle apparatus 90 degrees back into its horizontal position, after which, in step d), workpiece 23 has been inserted back into clamping apparatus 22.

After clamping apparatus 22 has once again been pivoted into its first vertical position in step e), the former underside 37 of workpiece 23 is now facing upward and is accessible for machining.

FIG. 5 shows, in depictions comparable to those of FIGS. 3 and 4, two further embodiments for reclamping of workpiece 23.

In step a), clamping apparatus 22 is set up by the cradle apparatus in its horizontal position, in which workpiece 23 therefore has its underside 37 facing downward. In step b), workpiece 23 has once again been removed from clamping apparatus 22 by the spindle gripper, of which only gripper jaws 33 are indicated in FIG. 5.

In step c), clamping apparatus 22 has been pivoted back into its vertical position; in the right-hand image, the spindle gripper has additionally been rotated 90 degrees so that workpiece 23 now has its former end face 36 facing forward.

In step d), workpiece 23 is introduced by the spindle gripper back into clamping apparatus 22, whereupon in step e), clamping apparatus 22 is then pivoted 180 degrees to the left in FIG. 5, and 90 degrees to the right.

In the left embodiment of FIG. 5, after the completion of step e) cradle apparatus 12 is in a vertical position and holds workpiece 23 with its former underside 37 facing up-ward.

In the right embodiment of FIG. 5, after the completion of step e) clamping apparatus 22 is in its horizontal position, in which workpiece 23 now has its former end face 36 facing upward. The former underside 37 is made accessible for machining by the fact that the cradle apparatus pivots clamping apparatus 22 through 90 degrees.

Therefore, what I claim is:

1. A method for operating a machine tool which comprises a spindle rotatable about a spindle axis; a spindle gripper, carried by the spindle, for gripping workpieces; and a cradle apparatus into which workpieces to be machined can be clamped and can be pivoted back and forth about a pivot axis of the cradle apparatus extending approximately perpendicular to the spindle axis, comprising the steps of:

a) set up the cradle apparatus with a clamped workpiece and in a first position;

b) remove the clamped workpiece from the cradle apparatus with the spindle gripper and hold the workpiece in the spindle gripper;

c) pivot the empty cradle apparatus into a second position;

d) insert the workpiece, held by the spindle gripper, into the cradle apparatus; and e) pivot the cradle apparatus into a further position for further machining of the workpiece that is once again clamped in.

2. The method as defined in claim 1, wherein in step c) the spindle gripper holding the workpiece is additionally rotated about the spindle axis.

3. The method as defined in claim 1, wherein the cradle apparatus in step a) is set up in a vertical position pivoted approximately 90 degrees out of its horizontal position; in step c) is pivoted approximately 180 degrees into its other vertical position; and in step e) is pivoted 90 degrees back into the horizontal position.

4. The method as defined in claim 2, wherein the cradle apparatus in step a) is set up in its horizontal position;

in step c) is pivoted approximately 90 degrees into one vertical position; and in step e) is pivoted 180 degrees into its other vertical position.

5. The method as defined in claim 1, wherein the cradle apparatus in step a) is set up in a vertical position pivoted approximately 90 degrees from its horizontal position; in step c) is pivoted approximately 90 degrees back into its horizontal position; and in step e) is pivoted 90 degrees back into its first vertical position.

6. The method as defined in claim 4, wherein in step c), the spindle gripper is rotated 90 degrees.

7. A method for operating a machine tool which comprises a spindle rotatable about a spindle axis; a spindle gripper, carried by the spindle, for gripping workpieces; and a cradle apparatus into which workpieces to be machined can be clamped and can be pivoted back and forth about a pivot axis of the cradle apparatus extending approximately perpendicular to the spindle axis, comprising the steps of:

a) set up the cradle apparatus with a clamped workpiece and in a first position;

b) remove the clamped workpiece from the cradle apparatus with the spindle gripper and hold the workpiece in the spindle gripper;

c) rotate the spindle gripper holding the workpiece about the spindle axis;

d) insert the workpiece, held by the spindle gripper, into the cradle apparatus; and e) pivot the cradle apparatus into a further position for further machining of the workpiece that is once again clamped in.

8. The method as defined in claim 7, wherein in step a) the cradle apparatus is set up in a vertical position pivoted approximately 90 degrees out of its horizontal position; in step c) the spindle gripper is rotated approximately 180 degrees; and in step e) the cradle apparatus is pivoted 90 degrees back into the horizontal position.

* * * * *